(12) United States Patent
Seo

(10) Patent No.: US 7,532,603 B2
(45) Date of Patent: May 12, 2009

(54) METHOD AND SYSTEM FOR MONITORING BROADCAST SLOT OF MOBILE STATION

(75) Inventor: Kwang-Seok Seo, Seoul (KR)

(73) Assignee: Pantech & Curitel Communications, Inc., Seoul (KR)

( * ) Notice: Subject to any disclaimer, the term of this patent is extended or adjusted under 35 U.S.C. 154(b) by 523 days.

(21) Appl. No.: 11/167,316

(22) Filed: Jun. 28, 2005

(65) Prior Publication Data
US 2006/0039307 A1 Feb. 23, 2006

(30) Foreign Application Priority Data
Aug. 21, 2004 (KR) .................. 10-2004-0066137

(51) Int. Cl.
*H04Q 7/00* (2006.01)
(52) U.S. Cl. .................. 370/336; 370/329; 370/345; 370/338; 455/550.1; 455/414.3
(58) Field of Classification Search ......... 370/329–331, 370/328, 324, 326, 311–12, 318, 322, 337–350, 370/458, 317; 455/403, 434, 458, 455, 450–453, 455/509, 95, 515–517, 550.1–553, 44, 62, 455/50, 55, 574, 522, 69; 725/44, 62, 50, 725/55
See application file for complete search history.

(56) References Cited
U.S. PATENT DOCUMENTS

| | | | |
|---|---|---|---|
| 6,434,397 B1 * | 8/2002 | Hazama | 455/515 |
| 6,567,606 B2 | 5/2003 | Milnes | |
| 6,728,300 B1 * | 4/2004 | Sarkar et al. | 375/147 |
| 6,973,310 B2 * | 12/2005 | Neufeld | 455/436 |
| 7,035,627 B1 * | 4/2006 | Collins et al. | 455/414.3 |
| 2002/0091792 A1 * | 7/2002 | Janniello et al. | 709/217 |
| 2002/0184630 A1 * | 12/2002 | Nishizawa et al. | 725/44 |
| 2003/0083977 A1 * | 5/2003 | Syed | 705/37 |
| 2004/0242203 A1 * | 12/2004 | Lipsanen et al. | 455/412.1 |
| 2005/0002370 A1 * | 1/2005 | An et al. | 370/345 |
| 2005/0036464 A1 * | 2/2005 | Rajkotia et al. | 370/347 |
| 2005/0043020 A1 * | 2/2005 | Lipsanen et al. | 455/422.1 |
| 2005/0054331 A1 * | 3/2005 | Balachandran et al. | 455/414.1 |
| 2005/0164741 A1 * | 7/2005 | Rajkotia et al. | 455/561 |
| 2006/0116163 A1 * | 6/2006 | Golightly | 455/557 |

* cited by examiner

*Primary Examiner*—Kamran Afshar
(74) *Attorney, Agent, or Firm*—H.C. Park & Associates, PLC

(57) ABSTRACT

Disclosed is a method and system for monitoring a broadcast slot of a mobile station. The system includes a mobile station execution module, wherein the mobile station execution module comprises: a broadcast channel setup information storage unit for storing broadcast channel setup information including at least one channel identification information and a broadcast time of each broadcast channel; and a broadcast slot monitoring controller for turning broadcast slot monitoring on during a predetermined time corresponding to the broadcast time of each broadcast channel contained in the broadcast channel setup information, and turning broadcast slot monitoring off during non-broadcast times.

25 Claims, 4 Drawing Sheets

METHOD AND SYSTEM FOR MONITORING BROADCAST SLOT OF MOBILE STATION

BACKGROUND OF THE INVENTION

This application claims the priority of Korean Patent Application No. 2004-66137, filed on Aug. 21, 2004, in the Korean Intellectual Property Office, the disclosure of which is incorporated herein in its entirety by reference.

1. Field of the Invention

The present invention relates to a method and system for monitoring a broadcast slot used in a mobile station and, more particularly, to a method and system for monitoring a broadcast slot used in a mobile station, which is capable of reducing battery power consumption in the mobile station by turning broadcast slot monitoring off except during user-selected broadcast times.

2. Description of the Related Art

Upon power-up, a mobile station (MS) selects a mobile communication system where the mobile station has been registered, synchronizes the mobile communication system over a pilot channel and a synchronous (Sync) channel, and monitors a paging channel in an idle state. During the idle state, when a user receives from a base station (BS) a paging channel message which needs a response, makes a telephone call using the mobile station, or registers the location of the mobile station, the mobile station is switched to an access state and transmits a necessary message to the base station over an access channel.

A message transmitted over the paging channel includes an overhead message related to an overall system configuration, and a designation message related to a response to a paging signal of a mobile station. In more detail, the overhead message is repeatedly transmitted to all mobile stations over a paging channel slot, while the designation message is transmitted to a specific mobile station over a slot specified in a slotted mode. On the other hand, a broadcast message is transmitted over a broadcast slot rather than the slot specified in the slotted mode at a broadcast slot cycle defined in an extended system parameter message which is a kind of the overhead message.

The mobile station operates a reception circuit during 160~240 msec (including a time when the mobile station wakes up from the idle state) at regular intervals specified in the slotted mode (e.g., about 2.6 seconds if a slot cycle index is 2) to monitor whether or not to be paged. Consequently, the battery lifetime of the mobile station depends on the monitoring period of the paging channel slot.

Since the broadcast message is transmitted over the broadcast slot rather than the slot specified in the slotted mode, the mobile station monitors the broadcast slot in addition to the paging channel slot. On the other hand, a conventional mobile station opens the broadcast slot all the time even though a broadcast time of each broadcast channel is fixed in advance. Accordingly, the conventional mobile station unnecessarily monitors the broadcast slot during non-broadcast times, resulting in reduced battery lifetime of the mobile station.

SUMMARY OF THE INVENTION

The present invention provides a method and system for monitoring a broadcast slot of a mobile station, which is capable of minimizing battery power consumption in the mobile station.

In accordance with an aspect of the present invention, there is provided a broadcast slot monitoring system of a mobile station comprising a mobile station execution module, wherein the mobile station execution module comprises: a broadcast channel setup information storage unit for storing broadcast channel setup information including at least one channel identification information and a broadcast time of each broadcast channel; and a broadcast slot monitoring controller for turning broadcast slot monitoring on during a predetermined time corresponding to the broadcast time of each broadcast channel contained in the broadcast channel setup information, and turning broadcast slot monitoring off during non-broadcast times.

The mobile station execution module may further comprise a broadcast channel setup information receiver for receiving the broadcast channel setup information from a mobile communication system.

The broadcast channel setup information receiver may receive the broadcast channel setup information in an SMS (short message service) scheme.

The broadcast slot monitoring system may further comprise a broadcast channel setup service server execution module for receiving broadcast channel setup information from a user using a GUI (Graphic User Interface) offered for broadcast channel setup to the user having accessed through a user terminal such as mobile station, PDA (personal digital assistant), or personal computer, and transmitting the broadcast channel setup information to a mobile station of the user.

The broadcast channel setup service server execution module may comprise: a broadcast channel setup information input unit for receiving broadcast channel setup information from a user using a GUI offered for broadcast channel setup; and a broadcast channel setup information transmission unit for transmitting the broadcast channel setup information inputted through the broadcast channel setup information input unit to a mobile station of the user.

The broadcast channel setup information transmission unit may transmit the broadcast channel setup information to the user's mobile station in an SMS scheme.

The broadcast channel setup service server execution module may further comprise a membership management unit for receiving membership information from the user using the GUI offered for inputting the membership information including the user mobile station' number, processing membership registration/update, and storing the membership information.

The broadcast channel setup service server may be a WAP (Wireless Application Protocol) or a Web server.

In accordance with another aspect of the present invention, there is provided a mobile station comprising the broadcast slot monitoring system.

In accordance with another aspect of the present invention, there is a method of monitoring a broadcast slot of a mobile station, comprising the steps of: determining whether or not a current time has reached a broadcast time of each broadcast channel contained in broadcast channel setup information including at least one channel identification information and the broadcast time of each broadcast channel; and turning broadcast slot monitoring on when the current time reaches the broadcast time of each broadcast channel, and turning broadcast slot monitoring off when the broadcast time of each broadcast channel is over.

The method may further comprise the steps of: receiving the broadcast channel setup information from a mobile communication system; and storing the received broadcast channel setup information.

The step of receiving the broadcast channel setup information may comprise the step of receiving the broadcast channel setup information in an SMS scheme.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
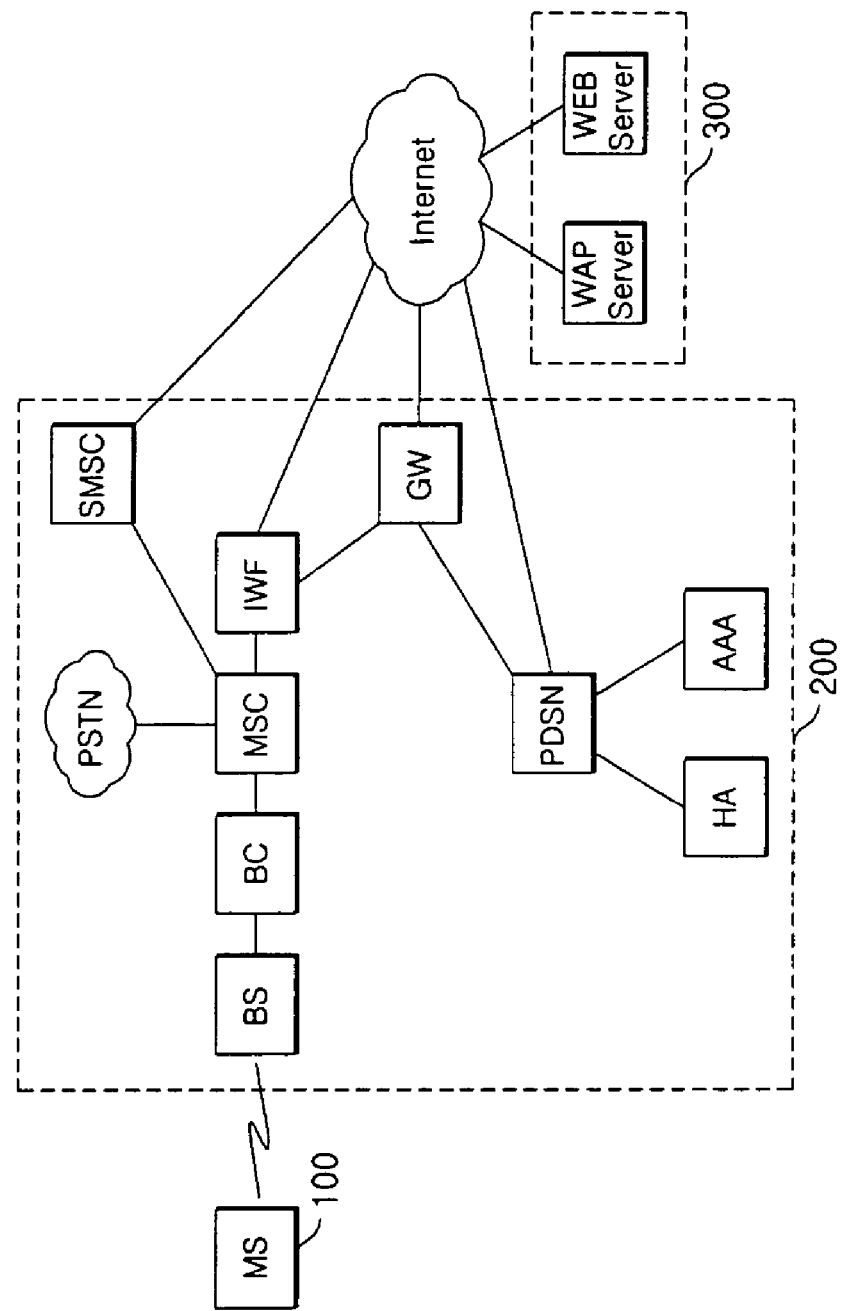
FIG. 1 is a block diagram showing a system for monitoring a broadcast slot of a mobile station in accordance with the present invention.

Exemplary embodiments of the present invention will be described in detail with reference to the annexed drawings, where the same elements are denoted by the same reference numerals even though they are depicted in different drawings.

FIG. 1 is a block diagram showing a system for monitoring a broadcast slot of a mobile station in accordance with the present invention.

The system for monitoring a broadcast slot of a mobile station comprises a mobile station 100, a mobile communication system 200, and a broadcast channel setup service server 300. The mobile station 100 includes a mobile station execution module which monitors the broadcast slot during a predetermined time corresponding to a broadcast time of each broadcast channel, which is contained in broadcast channel setup information set by a user, but does not monitor during times rather than the predetermined time. The mobile communication system 200 offers voice and data communication services to the mobile station. The broadcast channel setup service server 300 includes a broadcast channel setup service server execution module which enables the user to set a desired broadcast channel using the mobile station, personal digital assistant (PDA), personal computer, etc. The mobile communication system 200 may include a base station (BS), a base station controller (BC), a mobile switching center (MSC), a packet switched telephone network (PSTN), an inter-working function (IWF), a short message service center (SMSC), a gateway (GW) to the internet, a racket data serving node (PDSN), a home authority (HA), and an authentication, authorization, and accounting server (AAA). A more detailed description of the mobile communication system 200 will herein be omitted.

Figure 2:
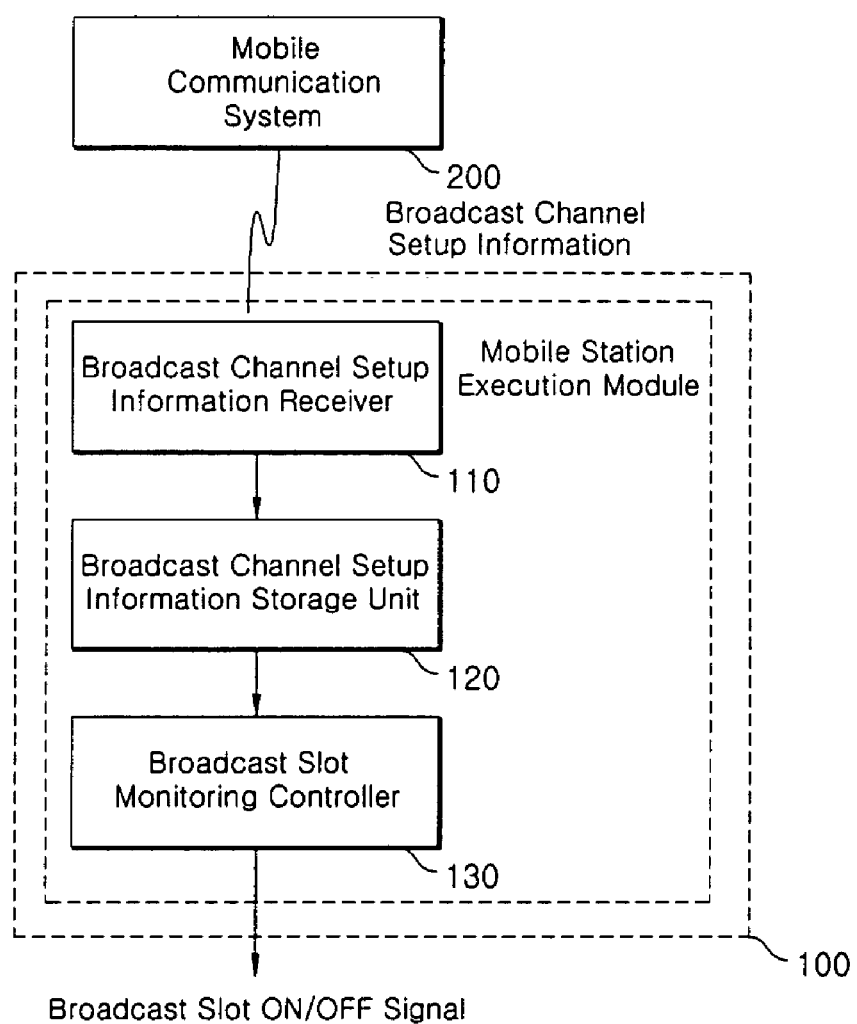
FIG. 2 is a block diagram showing a system for monitoring a broadcast slot of a mobile station in accordance with an embodiment of the present invention.

FIG. 2 is a block diagram showing a system for monitoring a broadcast slot of a mobile station in accordance with an embodiment of the present invention.

The broadcast slot monitoring system of the mobile station includes a mobile station execution module, which is configured in the form of a software program incorporated in the mobile station. The mobile station execution module includes a broadcast channel setup information receiver 110, a broadcast channel setup information storage unit 120, and a broadcast slot monitoring controller 130.

The broadcast channel setup information receiver 110 receives broadcast channel setup information from the mobile communication system 200. When a user accesses the broadcast channel setup service server 300 for offering a broadcast channel setup service and sets a desired broadcast channel, the broadcast channel setup service server 300 transmits, to the mobile station 100 of the user, broadcast channel setup information including at least one user-selected broadcast channel identification information (i.e., a broadcast channel value, a broadcast channel name, an attribute, etc.) and a broadcast time of each broadcast channel. The mobile station execution module incorporated in the mobile station 100 receives the broadcast channel setup information, which has been transmitted from the broadcast channel setup service server 300 to the broadcast channel setup information receiver 110 through the mobile communication system 200.

In this case, the broadcast channel setup service server 300 may transmit a short message including the broadcast channel setup information to the mobile station 100 of the user. In addition, the broadcast channel setup service server 300 may transmit a broadcast message to the mobile station 100 over a broadcast slot with an element identifying a telephone number attached. The broadcast channel setup information which exceeds the short message capacity (e.g., 80 bytes in a CDMA scheme) is divided to be transmitted to the mobile station 100. Technologies for dividing a large-capacity message and transmitting the divided messages in relation with a short message service (SMS) are well known in the art, and thus their detailed descriptions will be omitted.

The broadcast channel setup information receiver 110 receives the broadcast channel setup information using the SMS scheme. In more detail, the short message transmitted from the broadcast channel setup service server 300 is transmitted to the broadcast channel setup information receiver 110 in the mobile station 100 through the mobile communication system 200 of a mobile carrier, to which the mobile station 100 has been registered, over a slot designated for the short message of the paging channel.

The broadcast channel setup information storage unit 120 stores broadcast channel setup information including at least one channel identification information and a broadcast time of each broadcast channel. In other words, the mobile station execution module stores the broadcast channel setup information, which is received by the broadcast channel setup information receiver 110, in the broadcast channel setup information storage unit 120.

The broadcast slot monitoring controller 130 turns broadcast slot monitoring on during a predetermined time corresponding to the broadcast time of each broadcast channel contained in the broadcast channel setup information, but turns broadcast slot monitoring off during times other than the predetermined time. In more detail, with reference to the broadcast channel setup information stored in the broadcast channel setup information storage unit 120, the mobile station execution module transmits a control signal for broadcast slot monitoring to a broadcast slot control module (not shown), such as an MSM chip (or CDMA call processing module), to turn on broadcast slot monitoring during a broadcast time of each broadcast channel selected by a corresponding user. For example, in the case where the user selects a news channel from 7 am to 8 am on Mondays through Saturdays and a music channel from 3 pm to 5 pm on Sundays, the mobile station execution module transmits the control signal for broadcast slot monitoring to the broadcast slot control module from 7 am to 8 am on Mondays through Saturdays and from 3 pm to 5 pm on Sundays. In the meantime, during the time except for the above broadcast time, the mobile station execution module transmits a control signal to turn broadcast slot monitoring off.

The broadcast message is periodically received through a base station of the mobile communication system 200 over the broadcast channel or broadcast slot of the mobile station 100. The mobile station 100 determines whether the broadcast slot will be switched on or off by determining whether or not a broadcast list contained in a broadcast message corresponds to a user-selected broadcast time by referring to user-selected broadcast channel setup information.

Accordingly, the broadcast slot monitoring system for the mobile station 100 according to the present invention does not monitor the broadcast slot during non-broadcast times, thereby minimizing battery power consumption in the mobile station 100.

In accordance with another embodiment of the present invention, the broadcast slot monitoring system for the mobile station 100 may further comprise a broadcast channel setup service server execution module which can be run in the broadcast channel setup service server 300. The broadcast channel setup service server execution module offers a graphic user interface (GUI) for broadcast channel setup to a user accessing through a user terminal such as a mobile station, PDA, or personal computer, receives broadcast channel setup information from the user through the GUI, and transmits the broadcast channel setup information to the mobile station 100 of the user. In this case, the broadcast channel setup service server 300 may be a Wireless Application Protocol (WAP) server offering a broadcast channel setup service over the wireless Internet, or a web server offering the broadcast channel setup service over the wireline Internet.

Figure 3:
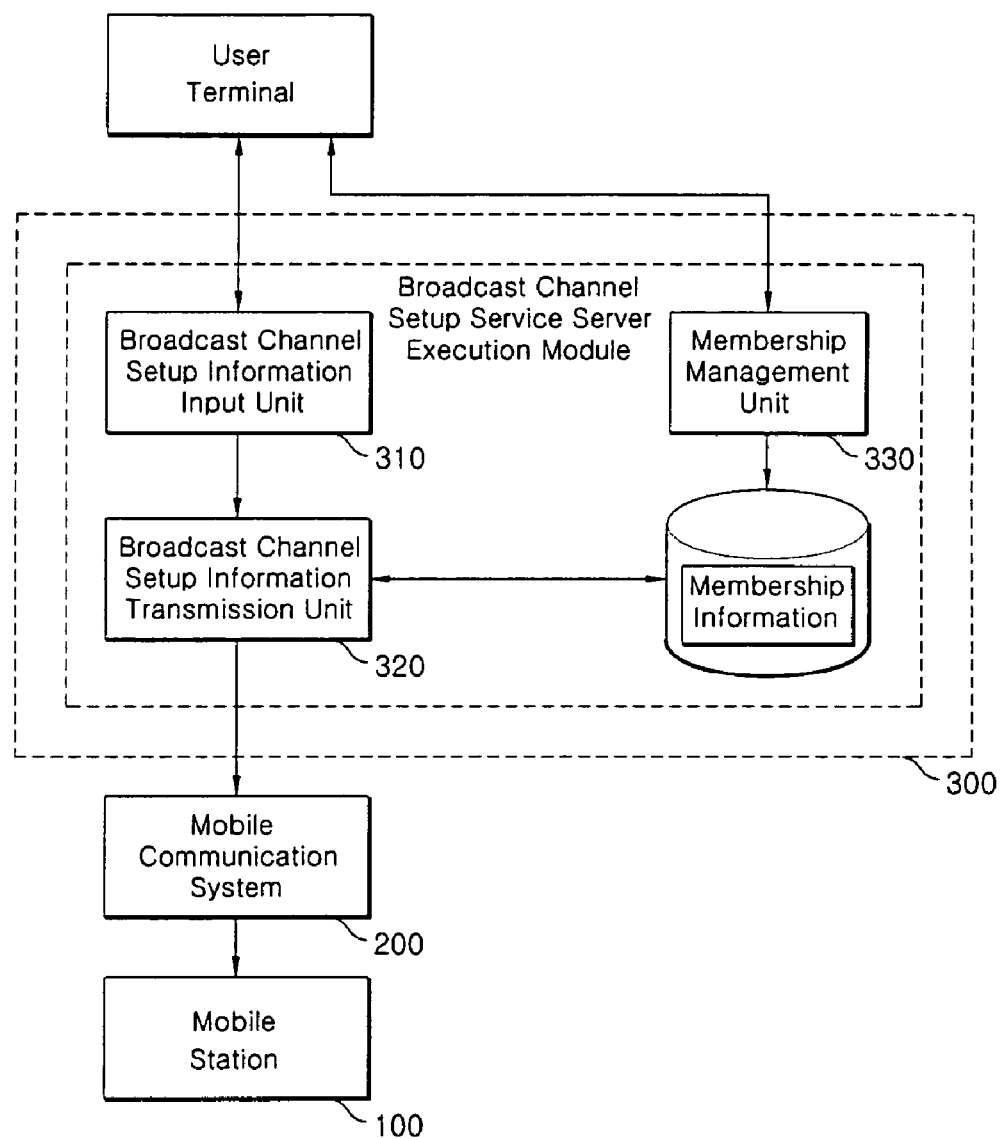
FIG. 3 is a block diagram showing a broadcast channel setup service server used in a system for monitoring a broadcast slot of a mobile station in accordance with the present invention.

FIG. 3 is a block diagram showing the broadcast channel setup service server used in the broadcast slot monitoring system of the mobile station in accordance with the present invention.

The broadcast channel setup service server 300 includes a broadcast channel setup service server execution module configured in the form of a software program. The broadcast channel setup service server execution module includes a broadcast channel setup information input unit 310 and a broadcast channel setup information transmission unit 320.

The broadcast channel setup information input unit 310 offers a user a GUI for broadcast channel setup, and receives broadcast channel setup information from the user through the GUI. In more detail, when the user gains access to the broadcast channel setup service server 300 using a user terminal such as a mobile station, PDA, or personal computer and requests broadcast channel setup from the broadcast channel setup service server 300, the broadcast channel setup service server execution module of the broadcast channel setup service server 300 offers a GUI for the broadcast channel setup through the broadcast channel setup information input unit 310, and receives the broadcast channel setup information from the user through the GUI. For example, the GUI for the broadcast channel setup may be one used for offering the user the broadcast channel list to be broadcasted over the mobile station and the broadcast times, and for allowing the user to select a desired broadcast channel from among the offered broadcast channels.

The broadcast channel setup information transmission unit 320 transmits the broadcast channel setup information inputted through the broadcast channel setup information input unit 310 to a mobile station 100 of a corresponding user. In this case, the broadcast channel setup information transmission unit 320 may transmit the broadcast channel setup information to the mobile station 100 using the SMS scheme. In more detail, when the user selects a desired broadcast channel using the broadcast channel setup information input unit 310, the broadcast channel setup service server execution module of the broadcast channel setup service server 300 creates and transmits broadcast channel setup information including broadcast channel identification information (i.e., a broadcast channel value and a broadcast channel name), which is selected by the user, and broadcast channel setup information including broadcast times of the broadcast channels to the mobile station 100 of the user.

Since the broadcast channel setup information thus transmitted is received by the mobile station 100 of the corresponding user and is in turn processed through the same procedure as in the embodiment shown in FIG. 2, the broadcast slot is not monitored during non-broadcast times. Consequently, it is possible to minimize battery power consumption in the mobile station 100.

In accordance with another preferred embodiment of the present invention, the broadcast channel setup service server execution module in the broadcast channel setup service server 300 further includes a membership management unit 330. The membership management unit 330 receives membership information from a user through a GUI, which is offered by the broadcast channel setup service server 300, for inputting the membership information including a mobile station's number, processes membership registration/update, and stores the membership information. That is, to offer a broadcast channel setup service on membership basis, the broadcast channel setup service server execution module in the broadcast channel setup service server 300 transmits a GUI for inputting membership information to a user terminal, such as a mobile station, PDA, or personal computer, accessing the broadcast channel setup service server 300, receives membership information from the user through the GUI, and processes membership registration/update. Accordingly, the broadcast channel setup information transmission unit 320 transmits the broadcast channel setup information to a user mobile station's phone number contained in the membership information, which is retrieved from a database. Technologies associated with the above-mentioned membership registration/update are well known in the art, and thus their detailed description will herein be omitted.

Figure 4:
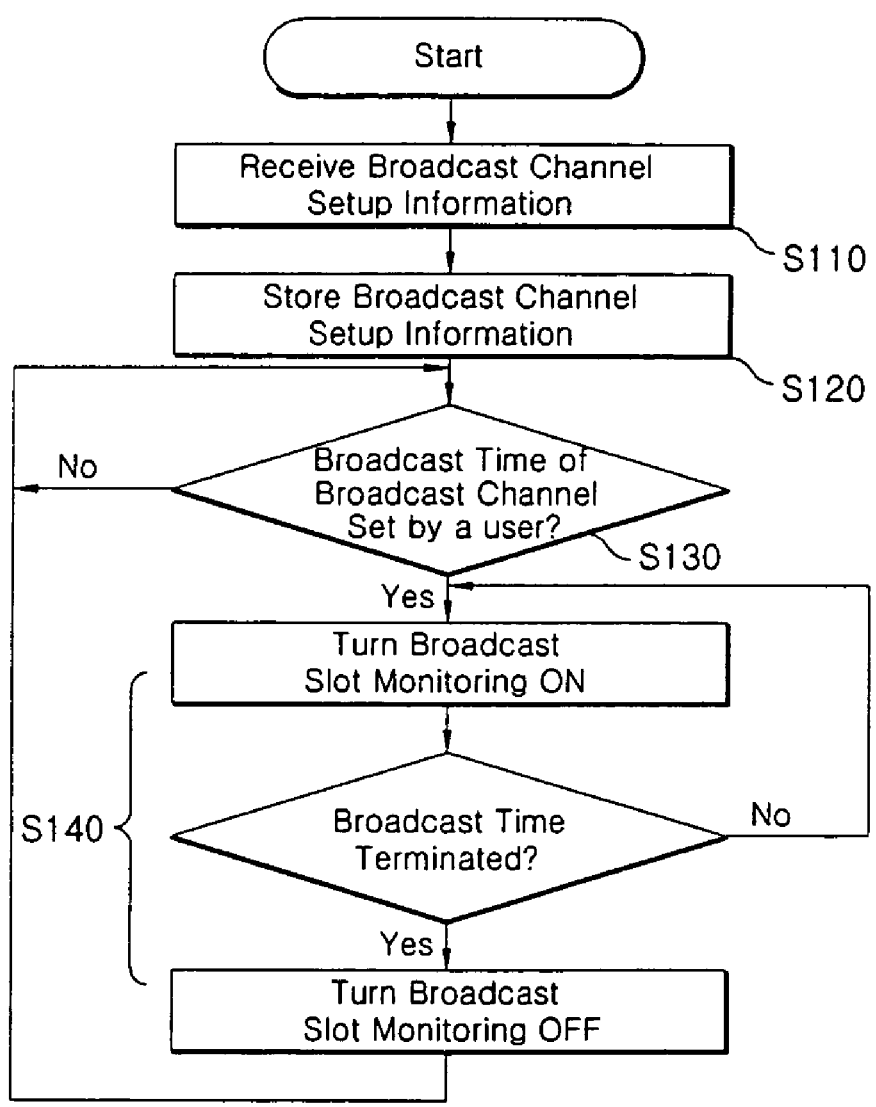
FIG. 4 is a flowchart showing a method of monitoring a broadcast slot of a mobile station in accordance with an embodiment of the present invention.

FIG. 4 is a flowchart showing a method of monitoring the broadcast slot of the mobile station in accordance with an embodiment of the present invention.

The mobile station execution module in the broadcast slot monitoring system receives broadcast channel setup information from the mobile communication system 200 by means of the broadcast channel setup information receiver 110 (step S110).

The mobile station execution module in the broadcast slot monitoring system stores the received broadcast channel setup information in the broadcast channel setup information storage unit 120 (step S120).

The mobile station execution module in the broadcast slot monitoring system determines whether or not a current time has reached a broadcast time of each broadcast channel using the broadcast slot monitoring controller 130 (step S130). In this case, the broadcast time of each broadcast channel is contained in the broadcast channel setup information, and the broadcast channel setup information includes at least one channel identification information and the broadcast time of each broadcast channel. The mobile station execution module turns broadcast slot monitoring on if the current time has reached the broadcast time of each broadcast channel, or turns broadcast slot monitoring off if the broadcast time of each broadcast channel is over (step S140). Accordingly, since the broadcast slot is not monitored during non-broadcast times, battery power consumption in the mobile station can be reduced.

While the present invention has been described with reference to exemplary embodiments thereof, it will be understood by those skilled in the art that various changes in form and details may be made therein without departing from the scope of the present invention as defined by the following claims.

What is claimed is:

1. A broadcast slot monitoring system of a mobile station comprising a mobile station execution module, wherein the mobile station execution module comprises:
   a broadcast channel setup information storage unit to store broadcast channel setup information including at least one channel identification information and a broadcast time of a broadcast channel; and
   a broadcast slot monitoring controller to turn broadcast slot monitoring on or off according to the broadcast time,
   wherein a user of the mobile station selects the broadcast channel setup information including the broadcast time.

2. The broadcast slot monitoring system of claim 1, wherein the mobile station execution module further comprises a broadcast channel setup information receiver to receive the broadcast channel setup information from a mobile communication system.

3. The broadcast slot monitoring system of claim 2, wherein the broadcast channel setup information receiver receives the broadcast channel setup information in an SMS (short message service) scheme.

4. The broadcast slot monitoring system of claim 2, further comprising a broadcast channel setup service server execution module to receive broadcast channel setup information from the user using a user terminal including at least one of a mobile station, PDA (personal digital assistant), and personal computer, and to transmit the broadcast channel setup information to the mobile station of the user.

5. The broadcast slot monitoring system of claim 4, wherein the broadcast channel setup service server execution module comprises:
   a broadcast channel setup information input unit to receive broadcast channel setup information from the user terminal; and
   a broadcast channel setup information transmission unit to transmit the broadcast channel setup information inputted through the broadcast channel setup information input unit to the mobile station of the user.

6. The broadcast slot monitoring system of claim 5, wherein the broadcast channel setup information transmission unit transmits the broadcast channel setup information to the user's mobile station in an SMS (short message service) scheme.

7. The broadcast slot monitoring system of claim 5, wherein the broadcast channel setup service server execution module further comprises a membership management unit to receive membership information from the user terminal, to process membership registration/update, and to store the membership information.

8. The broadcast slot monitoring system of claim 5, wherein the broadcast channel setup service server is a WAP (Wireless Application Protocol) server.

9. The broadcast slot monitoring system of claim 5, wherein the broadcast channel setup service server is a Web server.

10. The broadcast slot monitoring system of claim 6, wherein the broadcast channel setup service server is a WAP (Wireless Application Protocol) server.

11. The broadcast slot monitoring system of claim 7, wherein the broadcast channel setup service server is a WAP (Wireless Application Protocol) server.

12. The broadcast slot monitoring system of claim 6, wherein the broadcast channel setup service server is a Web server.

13. The broadcast slot monitoring system of claim 7, wherein the broadcast channel setup service server is a Web server.

14. The broadcast slot monitoring system of claim 4, wherein the broadcast channel setup service server is a WAP (Wireless Application Protocol) server.

15. The broadcast slot monitoring system of claim 4, wherein the broadcast channel setup service server is a Web server.

16. A mobile station comprising the broadcast slot monitoring system of claim 1.

17. The mobile station of claim 16, wherein the mobile station execution module further comprises a broadcast channel setup information receiver to receive the broadcast channel setup information from a mobile communication system.

18. The mobile station of claim 17, wherein the broadcast channel setup information receiver receives the broadcast channel setup information in an SMS (short message service) scheme.

19. The broadcast slot monitoring system of claim 1, wherein the broadcast slot monitoring controller turns broadcast slot monitoring on during a predetermined time corresponding to the broadcast time of the broadcast channel contained in the broadcast channel setup information.

20. The broadcast slot monitoring system of claim 1, wherein the broadcast slot monitoring controller turns broadcast slot monitoring off during non-broadcast times.

21. A method of monitoring a broadcast slot of a mobile station, comprising:
   determining whether a current time has reached a broadcast time of a broadcast channel contained in broadcast channel setup information including at least one channel identification information and the broadcast time of the broadcast channel; and
   turning broadcast slot monitoring on or off as a function of the broadcast time,
   wherein a user of the mobile station selects the broadcast channel setup information including the broadcast time.

22. The method of claim 21, further comprising:
   receiving the broadcast channel setup information from a mobile communication system; and
   storing the received broadcast channel setup information.

23. The method of claim 22, wherein receiving the broadcast channel setup information further comprises receiving the broadcast channel setup information in an SMS (short message service) scheme.

24. The method of claim 21, wherein broadcast slot monitoring is turned on when the current time reaches the broadcast time of the broadcast channel.

25. The method of claim 21, wherein broadcast slot monitoring is turned off when the broadcast time of the broadcast channel is over.

* * * * *